(12) United States Patent
Guo

(10) Patent No.: US 10,341,472 B2
(45) Date of Patent: Jul. 2, 2019

(54) WATERPROOF PUSH-BUTTON SWITCH FOR MOBILE TERMINAL, AND MOBILE TERMINAL

(71) Applicants: ZTE CORPORATION, Shenzhen (CN); NTT DOCOMO, INC, Chiyoda-Ku Tokyo, Tokyo (JP)

(72) Inventor: Haichao Guo, Shenzhen (CN)

(73) Assignee: ZTE Corporation, Shenzhen, Guangdon (CN)

( * ) Notice: Subject to any disclaimer, the term of this patent is extended or adjusted under 35 U.S.C. 154(b) by 0 days.

(21) Appl. No.: 16/085,118

(22) PCT Filed: May 4, 2016

(86) PCT No.: PCT/CN2016/081013
§ 371 (c)(1),
(2) Date: Sep. 14, 2018

(87) PCT Pub. No.: WO2016/197754
PCT Pub. Date: Dec. 15, 2016

(65) Prior Publication Data
US 2019/0116249 A1    Apr. 18, 2019

(30) Foreign Application Priority Data
Mar. 14, 2016  (CN) .................... 2016 1 010143006

(51) Int. Cl.
*H04B 1/38*  (2015.01)
*H04M 1/02*  (2006.01)
*H04B 1/3827*  (2015.01)

(52) U.S. Cl.
CPC ........ *H04M 1/0249* (2013.01); *H04B 1/3833* (2013.01); *H04B 2001/3894* (2013.01)

(58) Field of Classification Search
CPC ...... H04M 1/18; H04M 1/236; H04M 1/0202; H04M 1/23; H04W 4/14
See application file for complete search history.

(56) References Cited

U.S. PATENT DOCUMENTS 6,437,267 B1    8/2002  Imai
2006/0007059 A1*  1/2006  Bell .................... A41D 27/085
                                                                     345/55
(Continued)

FOREIGN PATENT DOCUMENTS

CN    2158488 Y    3/1994
CN    2337814 Y    9/1999
(Continued)

OTHER PUBLICATIONS

Supplementary European Search Report in European application No. 16806652.0, dated Nov. 21, 2018, 12 pgs.
(Continued)

*Primary Examiner* — Diane D Mizrahi
(74) *Attorney, Agent, or Firm* — Cooper Legal Group, LLC

(57) ABSTRACT

Waterproof push-button switch includes: a push mechanism, transmission mechanism and main waterproof piece. Push mechanism includes slider and push piece, two ends of slider being force application end and limiting end. Transmission mechanism comprises transmission rod and base provided with slide groove. Slider is in accommodating groove formed by terminal central frame and terminal outer frame; portion of push piece protrudes from terminal outer frame; limiting end matched with limiting piece on terminal central frame. Base is fixed on terminal central frame; main waterproof piece is between base and terminal central frame; slide groove on base is in communication with switch hole on terminal central frame. Transmission rod passes through slide groove and switch hole; end passing through switch (Continued)

hole to be located within accommodating groove being a force bearing end matched with force application end; end penetrating base being a toggle end matched with switch arm of controllable circuit.

20 Claims, 11 Drawing Sheets

(56) References Cited

U.S. PATENT DOCUMENTS

| | | | |
|---|---|---|---|
| 2013/0062173 A1 | 3/2013 | Kang | |
| 2013/0277187 A1* | 10/2013 | Huang | H01H 13/063 200/302.2 |
| 2013/0313087 A1* | 11/2013 | Le | H01H 13/06 200/302.2 |
| 2016/0313700 A1* | 10/2016 | Fraser | G04B 37/084 |

FOREIGN PATENT DOCUMENTS

| | | |
|---|---|---|
| CN | 1285602 A | 2/2001 |
| CN | 2872066 Y | 2/2007 |
| CN | 201295025 Y | 8/2009 |
| CN | 101539242 A | 9/2009 |
| CN | 201354946 Y | 12/2009 |
| CN | 201811002 U | 4/2011 |
| CN | 201877627 U | 6/2011 |
| CN | 202212287 U | 5/2012 |
| CN | 202534564 U | 11/2012 |
| CN | 103040532 A | 4/2013 |
| CN | 203074916 U | 7/2013 |
| CN | 203887847 U | 10/2014 |
| CN | 104157497 A | 11/2014 |
| CN | 204809081 U | 11/2015 |
| CN | 103040532 B | 12/2015 |
| CN | 204995576 U | 1/2016 |
| EP | 2568491 A1 | 3/2013 |
| JP | S63304539 A | 12/1988 |
| WO | 2015117349 A1 | 8/2015 |

OTHER PUBLICATIONS

International Search Report in international application No. PCT/CN2016/081013, dated Dec. 26, 2016, 2 pgs.

English Translation of the Written Opinion of the International Search Authority in international application No. PCT/CN2016/081013, dated Dec. 26, 2016, 4 pgs.

* cited by examiner

WATERPROOF PUSH-BUTTON SWITCH FOR MOBILE TERMINAL, AND MOBILE TERMINAL

TECHNICAL FIELD

The disclosure relates to, but is not limited to, a field of communication devices, and in particular, to a waterproof push-button switch for a mobile terminal and the mobile terminal.

BACKGROUND

At present, conventional push-button switches are widely used in mobile terminals such as mobile phones and pads, for implementing conventional user requirements such as volume control, off screen and power on/off. With the expansion of the use of the mobile phones, users are paying more and more attention to special requirements such as one-key to mute, one-key to alarm, one-key to turn on the flashlight, etc. As can be seen, in such a case, the push-button switch is not applicable because it is difficult for the user to simply and intuitively determine whether the switch is in the on or off state.

A small number of terminal devices, such as an IPHONE mobile phone, that are available on the market already have a push-button switch for one-key to mute. However, the push-button switches used in these mobile phones are not waterproof switches and thus are not effective for waterproofing. Although other products, such as professional flashlights, which are not communication products have waterproof push-button switches, their functions are simple and a degree of integration is low. Moreover, for these products, a high complexity and a unique performance of terminal communication products such as Radio Frequency (RF), audio and antenna are not taken into account. Thus, the design scheme of the waterproof push-button switch of these products is very different from that of the terminal communication products and cannot be used in the terminal communication products. Therefore, there is an urgent need to design a waterproof push-button switch suitable for the terminal.

SUMMARY

The following is an overview of the subject-matter detailed in this description. This summary is not intended to limit the scope of the claims.

The main technical problem to be solved by the embodiments of the disclosure is to provide a push-button switch for a mobile terminal and a mobile terminal, which can achieve a waterproof function.

A waterproof push-button switch for a mobile terminal is provided, which includes:

a pushing mechanism, a transmission mechanism and a main waterproof member; the pushing mechanism including a slider and a pushing member provided on the slider, one end of the slider being a force exerting end, and the other end of the slider being a position-limiting end; the transmission mechanism including a transmission rod and a base, and the base being provided with a sliding slot penetrating through the base.

The slider is disposed in a receiving slot formed by a middle frame of the terminal and an outer frame of the terminal, at least a portion of the pushing member protrudes from the outer frame of the terminal, and the position-limiting end cooperates with a position-limiting member on the middle frame of the terminal.

The base is fixed on the middle frame of the terminal, the main waterproof member is disposed between the base and the middle frame of the terminal, and the sliding slot on the base is in communication with a switch hole disposed on the middle frame of the terminal; the transmission rod passes through the sliding slot and the switch hole, one end of the transmission rod passing through the switch hole and located in the receiving slot is a force receiving end that cooperates with the force exerting end, and the other end of the transmission rod passing out of the base is a toggle end that cooperates with a switch arm of a circuit to be controlled.

In an embodiment, the transmission mechanism further includes a reset mechanism, the reset mechanism includes an elastic member, a first position-limiting protrusion is provided on the transmission rod, a second position-limiting protrusion is provided in a notch of the sliding slot, the elastic member is disposed between the first position-limiting protrusion and the second position-limiting protrusion, one end of the elastic member is disposed against the first position-limiting protrusion, and the other end of the elastic member is disposed against the second position-limiting protrusion.

In an embodiment, the position-limiting end is provided with a position-limiting bump, and the position-limiting member includes at least two grooves corresponding to the position-limiting bump which are disposed along a sliding direction of the slider at a bottom of the receiving slot; or the position-limiting end is provided with at least two grooves disposed along a sliding direction of the slider, and the position-limiting member is provided with a position-limiting bump corresponding to the grooves.

When the position-limiting bump is stuck in a groove of the at least two grooves that is far from the transmission rod, the transmission rod is not in contact with the switch arm; in a process that the slider is slid such that the position-limiting bump is to be stuck in a groove of the at least two grooves that is closer to the transmission rod, the force receiving end is pressed down by the force exerting end, such that the transmission rod is moved backward along an axis of the transmission rod, approaches and presses down the switch arm to turn on the circuit to be controlled.

In an embodiment, the position-limiting end further includes a pressure bar, one end of the pressure bar is connected to the slider, and the other end of the pressure bar is a free end, a hollow spacer is provided between the pressure bar and other parts of the position-limiting end, and the position-limiting bump or the at least two grooves is/are disposed on the pressure bar.

In an embodiment, the force exerting end includes an inclined surface, the force receiving end of the transmission rod has a curved surface as an end surface, and the end surface of the force receiving end is opposite to the inclined surface; when the slider is slid in the receiving slot to drive the force exerting end to move toward the transmission rod, the force receiving end is pressed down by the inclined surface, such that the transmission rod is moved backward along an axis of the transmission rod, approaches and presses down the switch arm to turn on the circuit to be controlled.

In an embodiment, the force exerting end further includes two side surfaces disposed on the inclined surface in a sliding direction of the slider, and the inclined surface and the two side surfaces together form a chute.

In an embodiment, the waterproof push-button switch for a mobile terminal further includes an auxiliary waterproof member, the auxiliary waterproof member is disposed in a space which is formed by the transmission rod and the sliding slot between the first position-limiting protrusion on the transmission rod and the main waterproof member.

In an embodiment, a switch of the circuit to be controlled is a rocker switch, and the switch arm is a rocker arm of the rocker switch.

In an embodiment, a side of the slider adjacent to the outer frame of the terminal is closely fitted with the outer frame of the terminal.

A mobile terminal is provided, which includes a waterproof push-button switch for a mobile terminal described above.

A waterproof push-button switch for a mobile terminal and a mobile terminal are provided according to embodiments of the disclosure. The waterproof push-button switch includes: a pushing mechanism, a transmission mechanism and a main waterproof member. The pushing mechanism includes a slider and a pushing member provided on the slider. The slider may be slid in the receiving slot formed by the outer frame of the terminal and the middle frame of the terminal. And a part of the pushing member on the slider protrudes from the outer frame of the terminal, so that the user can operate the protruding pushing member to complete the sliding. One end of the slider is a force exerting end and the other end is a position-limiting end. The force exerting end of the slider and the force receiving end of the transmission rod entering the receiving slot cooperate with each other. When the force receiving end is pressed down by the force exerting end with the sliding of the slider, the transmission rod is forced to move backward along the sliding slot on the base, the switch arm of the circuit to be controlled is triggered, such that the circuit to be controlled is connected, thereby an action to control a disconnection and connection of a circuit by a push-button switch is achieved. Between the middle frame of the terminal and the base of the transmission mechanism, a main waterproof member fixed between the two components is further disposed to realize waterproof between the middle frame of the terminal and the transmission mechanism, thereby ensuring waterproofness for the push-button switch. Moreover, the push-button switch in the disclosure also has advantages of small size, light weight and high integration.

DETAILED DESCRIPTION

Embodiments of the disclosure will be described in detail below with reference to the accompanying drawings. It is to be noted that, in the case of no conflict, the embodiments in the disclosure and features in the embodiments may be arbitrarily combined with each other.

A waterproof push-button switch according to an embodiment of the disclosure has a small volume and a high degree of integration, and is suitable for a push-button switch on an electronic product having a specific requirement on a volume of a switch such as a mobile terminal. And the push-button switch also has a good waterproofness.

Figure 1:
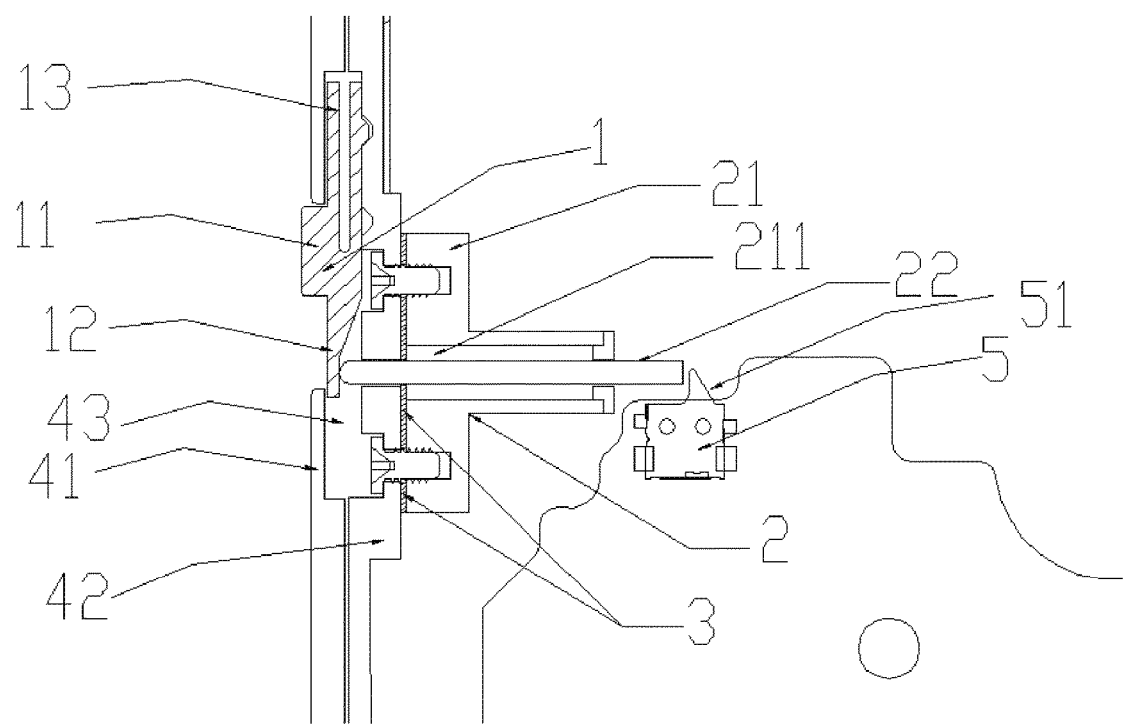
FIG. 1 is a cross-sectional view of a waterproof push-button switch according to an embodiment of the disclosure.

Reference is now made to FIG. 1, which is a cross-sectional view of a waterproof push-button switch according to an embodiment of the disclosure. The waterproof push-button switch includes a pushing mechanism 1, a transmission mechanism 2 and a main waterproof member 3. The pushing mechanism 1 is a part in the entire waterproof push-button switch that can be directly contacted by a user, and can convert a thrust applied by the user into a power required by the transmission mechanism. The transmission mechanism 2 can control a disconnection and connection of a circuit to be controlled by using the power transmitted by the pushing mechanism 1.

The pushing mechanism 1 includes a slider 12 and a pushing member 11 provided on the slider 12. One end of the slider 12 is a force exerting end, and the other end is a position-limiting end. The transmission mechanism 2 includes a transmission rod 22 and a base 21, and the base 21 is provided with a sliding slot 211 extending through both ends thereof.

The slider 12 is disposed in a receiving slot 43 formed by a middle frame 42 of the terminal and an outer frame 41 of the terminal. At least a portion of the pushing member 11 protrudes from the outer frame 41 of the terminal, and the position-limiting end cooperates with a position-limiting member on the middle frame 42 of the terminal. The base 21 is fixed on the middle frame 42 of the terminal, the main waterproof member 3 is disposed between the base 21 and the middle frame 42 of the terminal, and the sliding slot 211 on the base 21 is in communication with a switch hole (see FIG. 4, the switch hole 423) disposed on the middle frame 42 of the terminal. The transmission rod 22 passes through the sliding slot 211 and the switch hole, one end of which passing through the switch hole and located in the receiving slot 43 is a force receiving end that cooperates with the force exerting end, and the other end passing out of the base 21 is a toggle end that cooperates with a switch arm 51 of the circuit to be controlled.

Figure 2:
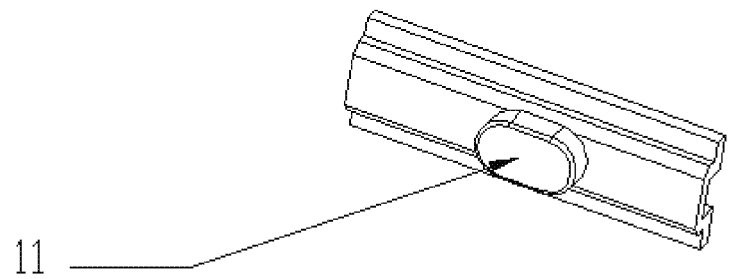
FIG. 2 is a front view of a slider of a waterproof push-button switch according to an embodiment of the disclosure.

Reference is now made to FIG. 2, in an embodiment of the disclosure, the pushing member 11 on the slider 12 may be a bump having a large degree of convexity on a front surface of the slider 12. A shape of the bump is not limited, and may optionally be a relatively attractive long oval shape or a simple rectangle shape.

Optionally, the above-mentioned main waterproof member 3 may have a structure with a through hole provided therein, and the size of the through hole matches a cross section of the transmission rod. When the main waterproof member is fixed between the middle frame of the terminal and the base, the transmission rod also passes through the through hole in the main waterproof member, and the waterproofing between the base and the middle frame of the terminal is achieved by using the main waterproof member. The above-mentioned main waterproof member may also be shaped, and the waterproofing effect is achieved by providing an arc-shaped edge to avoid the transmission rod.

In the above-mentioned waterproof push-button switch, the force receiving end of the transmission rod 22 is opposite to the force exerting end of the slider 12, and the toggle end of the transmission rod 22 is opposite to the switch arm 51 of the circuit to be controlled. When the force exerting end exerts pressure on the force receiving end, the transmission rod 22 moves backward, thereby the toggle end approaches and presses the switch arm 51, such that the circuit to be controlled is connected. With the pressure exerted on the force receiving end by the force exerting end is reduced, a reaction force of the switch arm 51 received by the toggle end is gradually greater than the pressure on the force receiving end, such that the transmission rod 22 is retracted to the previous position, the switch arm 51 is slowly restored, and the circuit to be controlled is disconnected.

Optionally, a switch of the circuit to be controlled in the embodiment is a rocker switch, and the switch arm described above is a rocker arm of the rocker switch.

Figure 3:
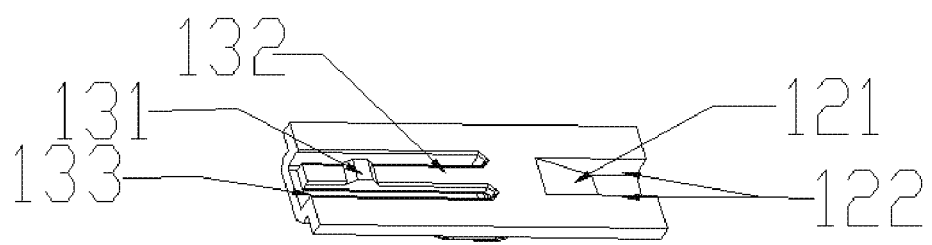
FIG. 3 is a rear view of a slider of a waterproof push-button switch according to an embodiment of the disclosure.
Figure 4:
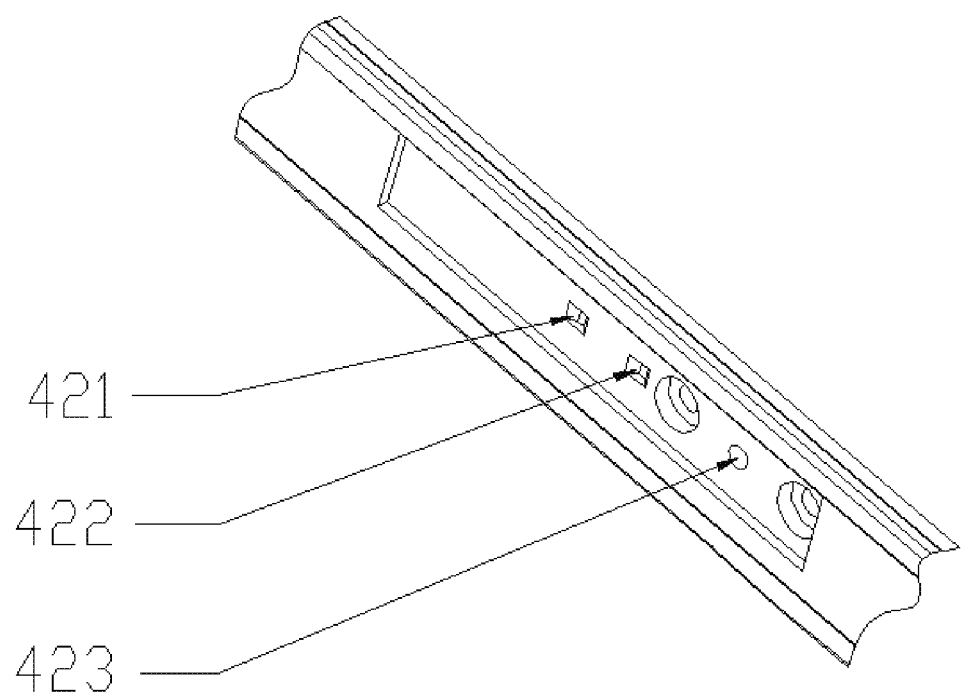
FIG. 4 is a front view of a middle frame according to an embodiment of the disclosure.
Figure 8:
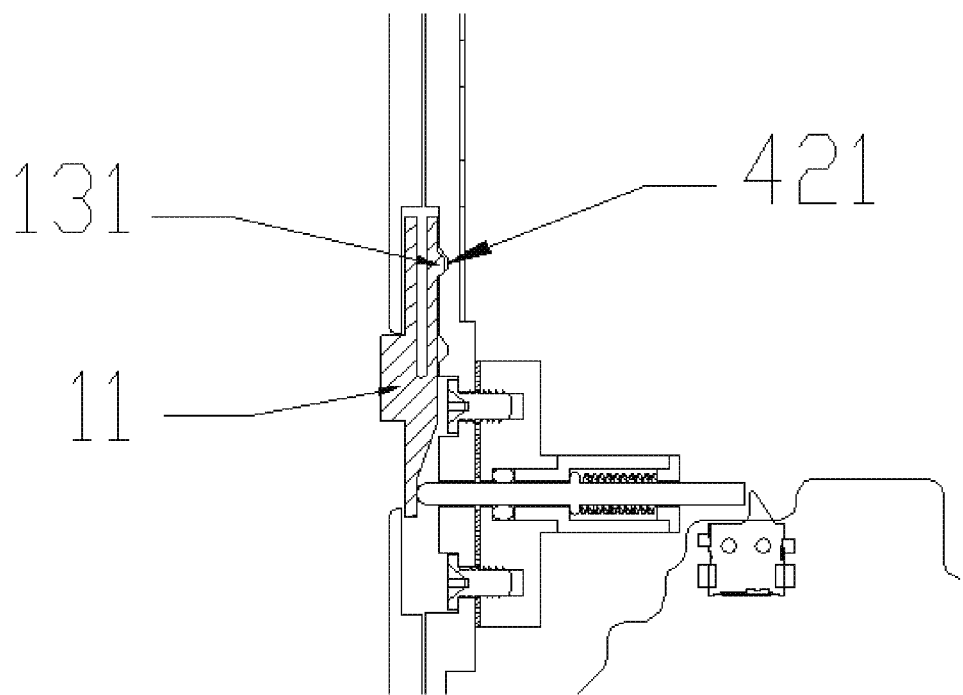
FIG. 8 is a cross-sectional view showing an off state of yet another waterproof push-button switch according to an embodiment of the disclosure.
Figure 9:
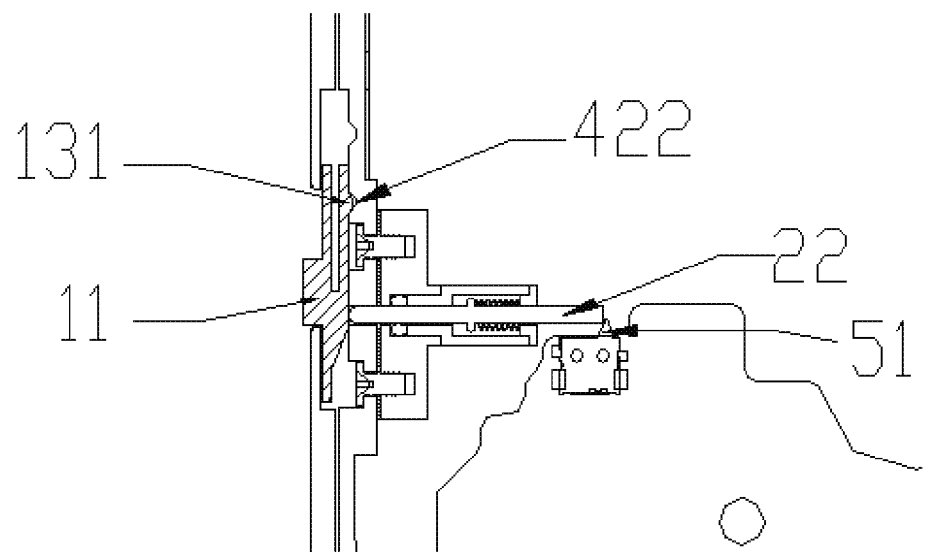
FIG. 9 is a cross-sectional view showing an on state of the yet another waterproof push-button switch according to an embodiment of the disclosure.

In the embodiment, the push-button switch has a function of controlling the disconnection and connection of the circuit to be controlled. Therefore, when the slider 12 of the push-button switch does not slide in the receiving slot, there are at least two positions respectively corresponding to the disconnected and connected state of the circuit. Accordingly, it is necessary for the position-limiting end 13 of the waterproof push-button switch to fix the slider at the two positions in the receiving slot. Optionally, the position-limiting end 13 is provided with a limiting protrusion 131 as illustrated in FIG. 3, and the position-limiting member includes at least two grooves 421 and 422 correspondingly disposed in the receiving slot and distributed along a sliding direction of the slider 12, as illustrated in FIG. 4. Referring to FIG. 8, when the limiting protrusion 131 is stuck in the groove 421 far from the transmission rod, the push-button switch is in an on state, and the circuit to be controlled at the rear end is not connected. Referring to FIG. 9, when the slider 12 slides down along the receiving slot, the limiting protrusion 131 leaves the groove 421 far from the transmission rod, and gradually approaches and is stuck in the groove 422 which is closer to the transmission rod. At this time, the force exerting end also slides downward, forcing the transmission rod 22 to move backward along the axis of the transmission rod, gradually approaching and pressing the switch arm 51 of the circuit to be controlled to turn on the circuit to be controlled.

It will be clear that the position of the limiting protrusion 131 and the groove may be exchanged, that is, a groove distributed along the sliding direction of the slider 12 may be disposed at the position-limiting end 13, and a corresponding limiting protrusion 131 may be disposed on the receiving slot.

It is required that a part where the limiting protrusion on the position-limiting end 13 or the groove is located has a deformation capacity so as to ensure that the limit protrusion 131 is easy to slide out from the groove when the user operates the slider 12, to increase a comfort for the user. Optionally, the position-limiting end 13 further includes a pressure bar 132 as illustrated in FIG. 3. One end of the pressure bar 132 is connected to the slider 12, and the other end of the pressure bar is a free end. A hollow spacer 133 is provided between the pressure bar and other parts of the position-limiting end, and the limiting protrusion 131 or the groove disposed at the position-limiting end is disposed on the pressure bar 132. The spacer 133 is provided such that the pressure bar 132 has a good elastic deformation capability. When the limiting protrusion 131 slides out of the groove, the pressure bar 132 may be deformed, and the free end of the pressure bar 132 is bent toward the spacer, such that the limiting protrusion 131 is more easily disengaged from the groove, and a resistance to stop the sliding of the limiting protrusion 131 is also reduced.

Figure 5:
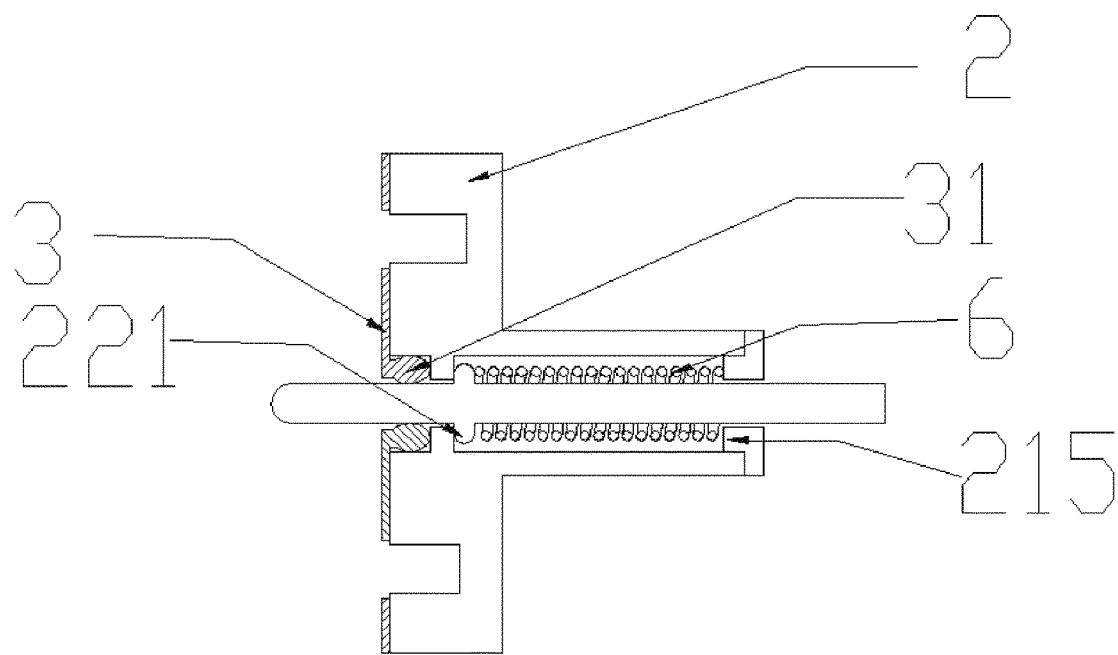
FIG. 5 is a cross-sectional view showing a reset mechanism of a waterproof push-button switch according to an embodiment of the disclosure.

In order to ensure that the force exerting end and the force receiving end can cooperate better during the sliding of the slider, optionally, the force exerting end includes an inclined surface 121 as illustrated in FIG. 3. Referring to FIG. 5, the force receiving end of the transmission rod has a curved surface as an end surface, and the force receiving end and the force exerting end are disposed opposite to each other, that is, the end surface of the force receiving end is opposite to the inclined surface 121 of the force exerting end. When the slider slides in the receiving slot and drives the force exerting end to move toward the transmission rod, the inclined surface 121 presses down the force receiving end, such that the transmission rod is moved backward along the axis of the transmission rod, approaches and presses down the switch arm to turn on the circuit to be controlled.

On the basis that the force exerting end includes the inclined surface, in order to guide a motion trajectory of the force receiving end of the transmission rod, optionally, the force exerting end further includes two side surfaces 122 disposed on the inclined surface 121 in the sliding direction of the slider, and the inclined surface 121 and the two side surfaces 122 together form a chute, as illustrated in FIG. 3.

Optionally, in addition to achieving the retraction of the transmission rod by utilizing an elastic force of the switch arm itself, the waterproof push-button switch in the embodiment may further include a reset mechanism as illustrated in FIG. 5, which is specifically designed for achieving the reset of the transmission rod. The reset mechanism includes an elastic member 6 having elasticity. The transmission rod is provided with a first position-limiting protrusion 221, and the first position-limiting protrusion 221 may be a flange or at least one arbitrary small bump. A second position-limiting protrusion 215 is provided in a notch of the sliding slot, which may be a flange or a bump formed directly in the notch, or may be a separate part fixed in the sliding slot. The elastic member 6 is disposed between the first position-limiting protrusion 221 and the second position-limiting protrusion 215, where one end of the elastic member 6 is disposed against the first position-limiting protrusion 221, and the other end of the elastic member is disposed against the second position-limiting protrusion 215. Optionally, the elastic member may be selected as a spring, and the spring is fitted over the transmission rod and stuck between the two limiting protrusions.

In general, in the above waterproof push-button switch, for the convenience of production, the sliding slot on the base is a through hole with a radius slightly larger than that of the transmission rod, which leads to an annular gap between the sliding slot fixed to the side of the base and the transmission rod, resulting in the base itself is not waterproof. In order to make the base waterproof, a flange may be provided in a notch of the sliding slot of the base when the base is made, and the inner diameter of the flange matches the radius of the transmission rod. However, this requires making changes to a structure of the base, and there is a need for a balance between the waterproofness and a friction force to which the transmission rod is subjected in the flange. For better and simpler achieving a purpose of waterproofing, optionally, the waterproof push-button switch further includes an auxiliary waterproof member 31 as illustrated in FIG. 5, the auxiliary waterproof member is disposed in a space which is formed by the transmission rod and the sliding slot between the first position-limiting protrusion 221 on the transmission rod and the main waterproof member 3.

Figure 6:
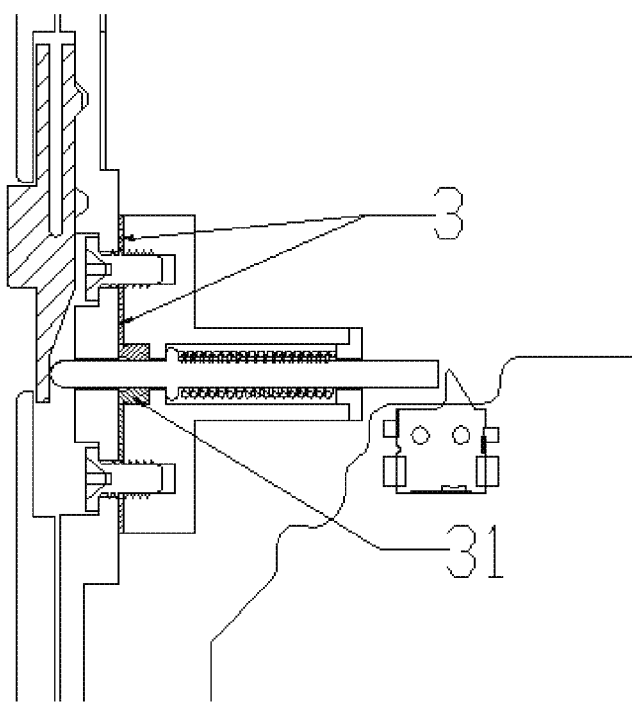
FIG. 6 is a cross-sectional view of another waterproof push-button switch according to an embodiment of the disclosure.

Optionally, referring to FIG. 6, the auxiliary waterproof member 31 in the embodiment may be integrated with the main waterproof member 3. When a through hole through which the transmission rod passes is provided on the main waterproof member 3, the auxiliary waterproof member 31 has a hollow rod-like structure extending from the through hole of the main waterproof member 3. Ideally, a radius of the hollow rod is equal to that of the transmission rod. Alternatively, the radius of the hollow rod can be slightly larger than that of the transmission rod. At this time, a resistance to which the transmission rod is subjected when moving is less, and waterproof performance of the base is slightly worse. Alternatively, the radius of the hollow rod can also be slightly smaller than that of the transmission rod. At this time, the resistance to which the transmission rod is subjected when moving is greater, and the waterproof performance of the base is better.

Figure 7:
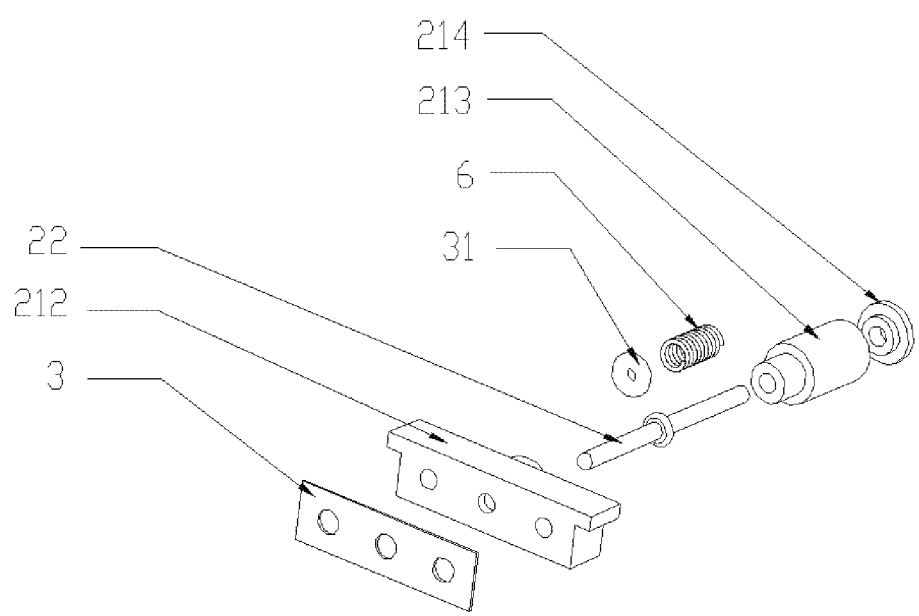
FIG. 7 shows an assembly diagram of a base of a waterproof push-button switch according to an embodiment of the disclosure.

Optionally, referring to FIG. 7, the base in the embodiment may also have a detachable structure. In particular, the base includes a cylinder bracket 212, a cylinder block 213 and a cylinder head 214. The cylinder bracket 212, the cylinder block 213 and the cylinder head 214 are respectively provided with a shaft hole, and can be assembled with each other. After assembly, axes of all the shaft holes coincide with each other, and the cylinder bracket 212, the cylinder block 213 and the cylinder head 214 may form a sliding slot in a cylindrical form. The spring 6 is fitted over the transmission rod to abut between the cylinder head 214 and the first position-limiting protrusion on the transmission rod 22, and may slide back and forth in the sliding slot together with the transmission rod 22. The auxiliary waterproof member 31 is fitted over the force receiving end of the transmission rod 22, such that the auxiliary waterproof member 31 is located in a groove-shaped receiving space formed by the cylinder bracket 212 and the cylinder block 213. At this time, the auxiliary waterproof member 31 is extruded and deformed, and is in close contact with the transmission rod 22, the cylinder bracket 212 and the cylinder block 213, thereby achieving waterproofing of the transmission mechanism.

Figure 10:
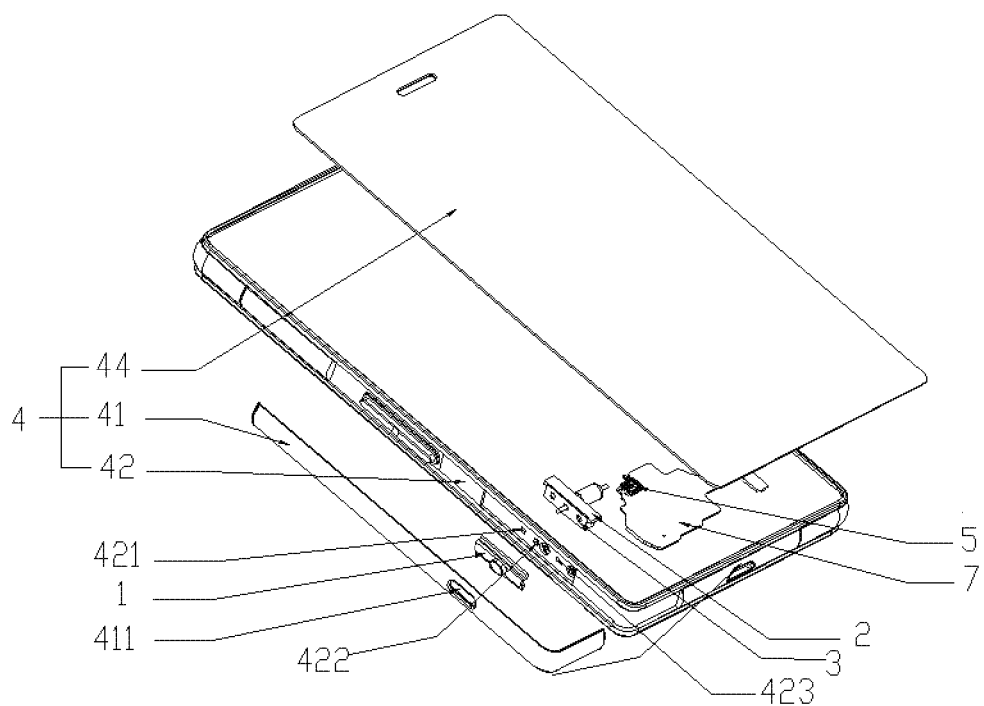
FIG. 10 shows an assembly diagram of a waterproof push-button switch assembled on a mobile terminal according to an embodiment of the disclosure.

FIG. 10 is an assembly diagram showing the waterproof push-button switch in the embodiment assembled on a mobile terminal. As illustrated in FIG. 10, after assembly, the outer frame 41 of the terminal has an elongated through hole 422 for facilitating the pushing member of the slider 12 to protrude from the outer frame 41 of the terminal. The outer frame 41 of the terminal and the middle frame 42 of the terminal realize a fixing of the push-button switch, and a cover plate 44 is assembled on an open surface of the middle frame 42 of the terminal, such that the middle frame 42 of the terminal is sealed with the cover plate 44.

Figure 11:
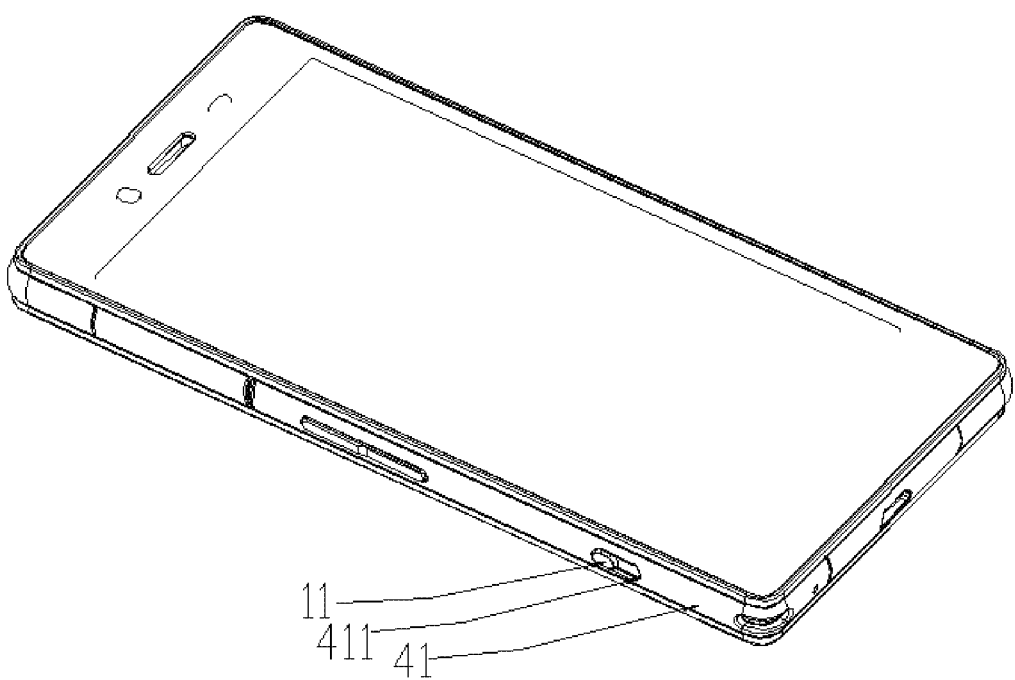
FIG. 11 shows a mobile terminal according to an embodiment of the disclosure.

Referring to FIG. 11, which shows a mobile terminal equipped with a waterproof push-button switch according to an embodiment of the disclosure. In the waterproof push-button switch, only the pushing member 11 exposed outside of the outer frame 41 of the terminal and a surface of the slider near the pushing member 11 are visible on the mobile terminal. Optionally, in order to fix the slider in the receiving slot between the outer frame 41 of the terminal and the middle frame of the terminal and achieve waterproofing, a side of the slider adjacent to the outer frame of the terminal is closely fitted with the outer frame of the terminal, that is, the surface of the slider on the side of the pushing member 11 is closely fitted with the outer frame 41 of the terminal.

The waterproof push-button switch in the embodiment includes a pushing mechanism, a transmission mechanism and a waterproof member; the pushing mechanism converts the thrust applied by the user into the power applied to the transmission rod, so that the transmission rod moves toward the switch arm of the circuit to be controlled until the switch arm is pressed down, thereby the connection of the circuit to be controlled is realized. The main waterproof member is disposed between the middle frame of the terminal and the base of the transmission mechanism, thereby realizing waterproof between the transmission mechanism and the middle frame of the terminal. The auxiliary waterproof member ensures the waterproof sealing in the base of the push-button switch itself, and the use of the main and auxiliary waterproof members greatly increases the waterproofness of the push-button switch according to the embodiment, so that the switch according to the embodiment is not only light and compact, but also suitable for the mobile terminal, and has a stronger waterproof effect and higher practicability.

Although the disclosure has been described in connection with specific embodiments, it should be understood that the disclosure as claimed should not be unduly limited to such specific embodiments. Those skilled in the art can make various modifications and variations to the disclosure without departing from the scope of the disclosure. Thus, if these modifications and variations of the disclosure fall within the scope of the claims of the disclosure and equivalent technologies thereof, the disclosure is also intended to include these modifications and variations.

INDUSTRIAL APPLICABILITY

The slider in the embodiment of the disclosure can slide in the receiving slot formed by the outer frame of the terminal and the middle frame of the terminal, and a part of the pushing member on the slider protrudes from the outer frame of the terminal, so that the user can operate the protruding pushing member to complete the sliding. One end of the slider is a force exerting end and the other end is a position-limiting end, the force exerting end of the slider and the force receiving end of the transmission rod entering the receiving slot cooperate with each other. When the force receiving end is pressed down by the force exerting end with the sliding of the slider, the transmission rod is forced to move backward along the sliding slot on the base, the switch arm of the circuit to be controlled is triggered, such that the circuit to be controlled is connected, thereby an action to control a disconnection and connection of a circuit is achieved. Between the middle frame of the terminal and the base of the transmission mechanism, a main waterproof member fixed between the two components is further disposed to realize waterproof between the middle frame of the terminal and the transmission mechanism, thereby ensuring waterproofness for the push-button switch. Moreover, the push-button switch in the disclosure also has advantages of small size, light weight and high integration.

The invention claimed is:
1. A waterproof push-button switch for a mobile terminal, comprising: a pushing mechanism, a transmission mechanism and a main waterproof member; the pushing mechanism comprising a slider and a pushing member provided on the slider, one end of the slider being a force exerting end, and the other end of the slider being a position-limiting end; the transmission mechanism comprising a transmission rod and a base, and the base being provided with a sliding slot penetrating through the base; wherein the slider is disposed in a receiving slot formed by a middle frame of the mobile terminal and an outer frame of the mobile terminal, at least a portion of the pushing member protrudes from the outer frame of the mobile terminal, and the position-limiting end cooperates with a position-limiting member on the middle frame of the mobile terminal;

the base is fixed on the middle frame of the mobile terminal, the main waterproof member is disposed between the base and the middle frame of the mobile terminal, and the sliding slot on the base is in communication with a switch hole disposed on the middle frame of the mobile terminal; the transmission rod passes through the sliding slot and the switch hole, one end of the transmission rod passing through the switch hole and located in the receiving slot is a force receiving end that cooperates with the force exerting end, and the other end of the transmission rod passing out of the base is a toggle end that cooperates with a switch arm of a circuit to be controlled.

2. The waterproof push-button switch for a mobile terminal of claim 1, wherein the transmission mechanism further comprises a reset mechanism, the reset mechanism comprises an elastic member, a first position-limiting protrusion is provided on the transmission rod, a second position-limiting protrusion is provided in a notch of the sliding slot, the elastic member is disposed between the first position-limiting protrusion and the second position-limiting protrusion, one end of the elastic member is disposed against the first position-limiting protrusion, and the other end of the elastic member is disposed against the second position-limiting protrusion.

3. The waterproof push-button switch for a mobile terminal of claim 2, wherein the position-limiting end is provided with a position-limiting bump, and the position-limiting member comprises at least two grooves corresponding to the position-limiting bump which are disposed along a sliding direction of the slider at a bottom of the receiving slot; or the position-limiting end is provided with at least two grooves disposed along a sliding direction of the slider, and the position-limiting member is provided with a position-limiting bump corresponding to the grooves;

when the position-limiting bump is stuck in a groove of the at least two grooves that is far from the transmission rod, the transmission rod is not in contact with the switch arm; in a process that the slider is slid such that the position-limiting bump is to be stuck in a groove of the at least two grooves that is closer to the transmission rod, the force receiving end is pressed down by the force exerting end, such that the transmission rod is moved backward along an axis of the transmission rod, approaches and presses down the switch arm to turn on the circuit to be controlled.

4. The waterproof push-button switch for a mobile terminal of claim 3, wherein the position-limiting end further comprises a pressure bar, one end of the pressure bar is connected to the slider, and the other end of the pressure bar is a free end, a hollow spacer is provided between the pressure bar and other parts of the position-limiting end, and the position-limiting bump or the at least two grooves is/are disposed on the pressure bar.

5. The waterproof push-button switch for a mobile terminal of claim 2, further comprising an auxiliary waterproof member, the auxiliary waterproof member being disposed in a space which is formed by the transmission rod and the sliding slot between the first position-limiting protrusion on the transmission rod and the main waterproof member.

6. The waterproof push-button switch for a mobile terminal of claim 5, wherein a switch of the circuit to be controlled is a rocker switch, and the switch arm is a rocker arm of the rocker switch.

7. The waterproof push-button switch for a mobile terminal of claim 5, wherein a side of the slider adjacent to the outer frame of the mobile terminal is closely fitted with the outer frame of the mobile terminal.

8. A mobile terminal, comprising a waterproof push-button switch for the mobile terminal, the waterproof push-button switch for the mobile terminal comprising: a pushing mechanism, a transmission mechanism and a main waterproof member; the pushing mechanism comprising a slider and a pushing member provided on the slider, one end of the slider being a force exerting end, and the other end of the slider being a position-limiting end; the transmission mechanism comprising a transmission rod and a base, and the base being provided with a sliding slot penetrating through the base; wherein the slider is disposed in a receiving slot formed by a middle frame of the mobile terminal and an outer frame of the mobile terminal, at least a portion of the pushing member protrudes from the outer frame of the mobile terminal, and the position-limiting end cooperates with a position-limiting member on the middle frame of the mobile terminal;

the base is fixed on the middle frame of the mobile terminal, the main waterproof member is disposed between the base and the middle frame of the mobile terminal, and the sliding slot on the base is in communication with a switch hole disposed on the middle frame of the mobile terminal; the transmission rod passes through the sliding slot and the switch hole, one end of the transmission rod passing through the switch hole and located in the receiving slot is a force receiving end that cooperates with the force exerting end, and the other end of the transmission rod passing out of the base is a toggle end that cooperates with a switch arm of a circuit to be controlled.

9. The mobile terminal of claim 8, wherein the transmission mechanism further comprises a reset mechanism, the reset mechanism comprises an elastic member, a first position-limiting protrusion is provided on the transmission rod, a second position-limiting protrusion is provided in a notch of the sliding slot, the elastic member is disposed between the first position-limiting protrusion and the second position-limiting protrusion, one end of the elastic member is disposed against the first position-limiting protrusion, and the other end of the elastic member is disposed against the second position-limiting protrusion.

10. The mobile terminal of claim 9, wherein the position-limiting end is provided with a position-limiting bump, and the position-limiting member comprises at least two grooves corresponding to the position-limiting bump which are disposed along a sliding direction of the slider at a bottom of the receiving slot; or the position-limiting end is provided with at least two grooves disposed along a sliding direction of the slider, and the position-limiting member is provided with a position-limiting bump corresponding to the grooves;

when the position-limiting bump is stuck in a groove of the at least two grooves that is far from the transmission rod, the transmission rod is not in contact with the switch arm; in a process that the slider is slid such that the position-limiting bump is to be stuck in a groove of the at least two grooves that is closer to the transmission rod, the force receiving end is pressed down by the force exerting end, such that the transmission rod is moved backward along an axis of the transmission rod, approaches and presses down the switch arm to turn on the circuit to be controlled.

11. The mobile terminal of claim 10, wherein the position-limiting end further comprises a pressure bar, one end of the pressure bar is connected to the slider, and the other end of the pressure bar is a free end, a hollow spacer is provided between the pressure bar and other parts of the position-limiting end, and the position-limiting bump or the at least two grooves is/are disposed on the pressure bar.

12. The mobile terminal of claim 9, wherein the force exerting end comprises an inclined surface, the force receiving end of the transmission rod has a curved surface as an end surface, and the end surface of the force receiving end is opposite to the inclined surface; when the slider is slid in the receiving slot to drive the force exerting end to move toward the transmission rod, the force receiving end is pressed down by the inclined surface, such that the transmission rod is moved backward along an axis of the transmission rod, approaches and presses down the switch arm to turn on the circuit to be controlled.

13. The mobile terminal of claim 12, wherein the force exerting end further comprises two side surfaces disposed on the inclined surface in a sliding direction of the slider, and the inclined surface and the two side surfaces together form a chute.

14. The mobile terminal of claim 9, further comprising an auxiliary waterproof member, the auxiliary waterproof member being disposed in a space which is formed by the transmission rod and the sliding slot between the first position-limiting protrusion on the transmission rod and the main waterproof member.

15. The mobile terminal of claim 14, wherein a switch of the circuit to be controlled is a rocker switch, and the switch arm is a rocker arm of the rocker switch.

16. The mobile terminal of claim 14, wherein a side of the slider adjacent to the outer frame of the mobile terminal is closely fitted with the outer frame of the mobile terminal.

17. The waterproof push-button switch for a mobile terminal of claim 3, further comprising an auxiliary waterproof member, the auxiliary waterproof member being disposed in a space which is formed by the transmission rod and the sliding slot between the first position-limiting protrusion on the transmission rod and the main waterproof member.

18. The waterproof push-button switch for a mobile terminal of claim 4, further comprising an auxiliary waterproof member, the auxiliary waterproof member being disposed in a space which is formed by the transmission rod and the sliding slot between the first position-limiting protrusion on the transmission rod and the main waterproof member.

19. The waterproof push-button switch for a mobile terminal of claim 2, wherein the force exerting end comprises an inclined surface, the force receiving end of the transmission rod has a curved surface as an end surface, and the end surface of the force receiving end is opposite to the inclined surface; when the slider is slid in the receiving slot to drive the force exerting end to move toward the transmission rod, the force receiving end is pressed down by the inclined surface, such that the transmission rod is moved backward along an axis of the transmission rod, approaches and presses down the switch arm to turn on the circuit to be controlled.

20. The waterproof push-button switch for a mobile terminal of claim 19, wherein the force exerting end further comprises two side surfaces disposed on the inclined surface in a sliding direction of the slider, and the inclined surface and the two side surfaces together form a chute.

* * * * *